United States Patent [19]

Kihlstedt

[11] 3,849,111

[45] Nov. 19, 1974

[54] METHOD FOR PURIFYING AND AGGLOMERATING PYRITE CINDERS

[75] Inventor: Per Gudmar Kihlstedt, Bromma, Sweden

[73] Assignee: AB Cold Bound Pellets, Djursholm, Sweden

[22] Filed: Dec. 16, 1969

[21] Appl. No.: 885,613

[30] Foreign Application Priority Data
Dec. 20, 1968 Sweden.............................. 17612/68

[52] U.S. Cl.............................. 75/2, 75/3, 106/120
[51] Int. Cl. ........................ C21b 1/24, C22b 1/00
[58] Field of Search ...................... 75/2, 3; 106/120

[56] References Cited
UNITED STATES PATENTS

| | | | |
|---|---|---|---|
| 833,005 | 10/1906 | Steenberg | 75/3 |
| 859,411 | 7/1907 | Schumacher | 75/3 |
| 1,518,828 | 12/1924 | Thornhill et al. | 75/2 |
| 2,665,996 | 1/1954 | Kalousek | 106/120 |
| 2,878,102 | 3/1959 | Sternfels | 75/2 X |
| 2,927,017 | 3/1960 | Marvin | 75/120 X |
| 3,235,371 | 2/1966 | Volin et al. | 75/3 |
| 3,257,220 | 6/1966 | Kalousek et al. | 106/120 |
| 3,317,643 | 5/1967 | Denny | 106/120 |
| 3,337,328 | 8/1967 | Lawver | 75/3 |
| 3,338,705 | 8/1967 | Meyer et al. | 75/3 |
| 3,582,317 | 6/1971 | Gamo et al. | 75/2 |

FOREIGN PATENTS OR APPLICATIONS

| | | | |
|---|---|---|---|
| 167,980 | 7/1956 | Australia | 75/2 |
| 588,694 | 12/1959 | Canada | 75/2 |
| 17,546 | 1907 | Great Britain | 75/3 |

*Primary Examiner*—A. B. Curtis
*Attorney, Agent, or Firm*—Fleit, Gipple & Jacobson

[57] ABSTRACT

Purifying and agglomerating pyrite cinders by subjecting ground pyrite cinders to a flotation operation and cold binding agglomerates of a mixture of the roasted and floated pyrite material and a binding agent. The roasted pyrite material may be leached before the flotation for the purpose of removing sulphate material therefrom.

12 Claims, No Drawings

METHOD FOR PURIFYING AND AGGLOMERATING PYRITE CINDERS

The present invention relates to a novel method for purifying and agglomerating pyrite cinders for the purpose of producing an improved agglomerated material from which the iron oxide present therein can readily be reduced to metallic iron.

The use of pyrite cinders as raw material in iron and steel manufacturing processes, particularly the blast furnace process, is at present associated with a number of disadvantages. One of these disadvantages is that the pyrites when roasted become porous, which renders agglomeration of the same difficult and causes a troublesome problem with regard to transportation thereof owing to the fact that such pyrites are liable to create dust and colour the surrounding. Furthermore, the pyrite cinders contain a residue of, among other things, sulphide bound sulphur, which has hitherto led to the use of roasting type agglomerating methods for removing the sulphide. Thus, as in the case of iron ore concentrate, the main methods for agglomerating pyrite cinders are suction sintering and pellet sintering, whereby the pyrite cinders, optionally in mixture with iron ore concentrate, are heated to about 1,400° and 1,250°C, respectively. These agglomerating methods, however, require large plants in order that the work may be carried out economically, and hence the agglomeration of pyrite cinders has hitherto been concentrated to a few large sintering plants, despite the disadvantages associated with the dust-free transport of cinders. Moreover, the pyrite cinders contain in the main impurities which originate from copper and zinc sulphide minerals in the sulphur pyrite ore; these impurities being liable to impair the quality of the iron and steel produced when using the pyrite cinders and complicate recovery of the iron content when using the blast furnace process. The chlorinating roasting process is, in certain instances, employed for the purpose of removing copper and zinc from the pyrite cinders, wherewith the copper and zinc impurities are converted to a soluble form and leached out. Leaching plants constructed for this purpose require, however, comprehensive investments and consequently, as in the case of suction and pellet sintering plants, are only to be found in a few places.

Thus it is evident that there is a need of processes of purifying and agglomerating pyrite cinders which, from an economic point of view, are not highly dependent on the size of the plants in which they are practiced, thereby allowing the size of the purifying and agglomerating plants to be adapted in accordance with the size of the sulphur pyrite roasting plants. This need is filled by means of the present invention, which also eliminates the aforementioned disadvantages and comprises a process for purifying and agglomerating pyrite cinders, the process being mainly characterized by the steps of grinding the pyrite cinders in at least one grinding operation, removing sulphide material from the ground roasted pyrite material by flotation, forming an aqueous mixture containing at least the ground and purified roasted pyrite material and a binding agent which possesses the ability of binding the mixture together subsequent to heating said mixture in an atmosphere essentially consisting of steam and imparting to the mixture a good degree of strength when the mixture is cold and when it is subjected to reducing conditions at elevated temperatures, producing agglomerates from the mixture and subjecting the agglomerates to thermic treatment in an atmosphere consisting essential of steam, at a temperature of approximately 160° – 230°C and a pressure of approximately 10 – 70 atmospheres above atmospheric. The process of the present invention provides agglomerates which fill the high requirements placed on purity, strength and which are not dust creating. The agglomerates may either be in the form of briquettes of desired shape or pellets produced by pellet rolling methods. Pelletized agglomerates of uniform size can readily be produced by means of the process of the present invention.

Among the binding agents which may be used in the process of the invention are calcium hydroxide, slaked steel furnace slag Portland cement and silica and silicate material. These binders may either be used individually or in any desired combination with each other. The binders may be initially present to a greater or smaller extent in the pyrite cinders and originate from gangue in the sulphur pyrite ore. When flotation is used for dressing the sulphur pyrite ore or partially dressed sulphur pyrite ore, the ore, however, is often so devoid of gangue that an insufficient quantity of silicate material for binding purposes remains in the sulphur pyrites subjected to roasting, whereupon a binder must be added. It is possible, when mixing solely slaked lime or solely finely divided silica to silicate-poor or silicate-free pyrite cinders, to obtain bonds in the agglomerate between the binder and the ground and floated roasted pyrite material of fully acceptable strength. Stronger bonds, however, are often obtained when using Portland cement as a binding agent. The ability of the binding agents to provide a strong agglomerate at both low and high temperatures is, however, essentially dependent upon the physical and chemical character of the roasted pyrite material, and the strongest agglomerates are often obtained by using combinations of the aforementioned binding agents. The most suitable binder for each type of roasted pyrite material can be determined to advantage experimentally.

The binder should be intimately mixed with the roasted pyrite material. The binder is suitably added in a finely-divided form and mixed with the roasted pyrite material. The mixture is suitably subjected to a grinding operation, in order to further homogenize the same, wherewith mechanochemical reactions which promote the subsequent binding and increase the strength of the final agglomerate can be caused to take place. Further, water is added to the mixture as required, the quantity of water added being such as to provide a consistency suitable for agglomerating purposes. Iron oxide material, preferably iron ore concentrate having a particle size greater than the particle size of the ground and purified roasted pyrite material can be added to said roasted pyrite material, either together with the binder or after the binder has been added.

As will be evident from the aforegoing, the agglomerate is actually bound by a so-called cold bonding process, i.e. bonding is caused by heating the agglomerate in an atmosphere consisting essentially of steam to a temperature which is low in relation to the sintering temperature of the materials forming part of the agglomerate. The cold binding process may conveniently be carried out in an autoclave, wherewith the steam atmosphere can be formed either solely by the water present in the agglomerate or by additional supply of water or steam to the autoclave. As previously mentioned, the temperatures and pressures used when cold binding the agglomerate reach to between approximately 160° and 230°C and between approximately 10 and 70 atmospheres in access of atmospheric, respectively, while the stay time in the autoclave reaches to between 1 and 24 hours.

Flotation of the ground roasted pyrite material, in which a dithiocarbonate or dithiophosphate type collector, often also designated xanthate and aerofloat type, is preferably used, does not only remove the majority of the sulphide content of the roasted pyrite material but also the major content of copper and zinc thereof. It has namely been found that a large portion of the sulphur, copper and zinc content of the pyrite cinders exists as non-roasted sulphides, which are readily floated off. In certain instances, however, a large portion, and even a major portion, of the sulphur copper and zinc content of the pyrite cinders exists as sulphates. In accordance with one feature of the invention, these sulphates can be removed by leaching or washing the roasted pyrite material with, for instance, lukewarm water or water to which has been added a certain quantity of sulphuric acid or some other suitable sulphur compound, in order to obtain a suitable pH value. This leaching or washing stage is preferably placed before the flotation stage and suitably also before the stage in which the pyrite cinders are ground to their final size.

The pyrite cinders are suitably ground down to a particle size of the order of between 80 percent by weight beneath 90 $\mu$m and 80 percent by weight beneath 30 $\mu$m.

In accordance with an exemplary representative embodiment of the process of the present invention, pyrite cinders containing 3.5 percent by weight S, 0.25 percent by weight Cu, 0.40 percent by weight Zn and the residue essentially $Fe_2O_3$ and $Fe_3O_4$ were leached in water to which a small quantity of sulphuric acid had been added. The leached pyrite cinders were then wet ground to a particle size of 80 percent by weight below 60 $\mu$m. The ground roasted pyrite material was floated in an approximately neutral environment with amylxanthate as a collecting reagent, wherewith approximately 7 percent of the total weight of the roasted pyrite material was floated off. The remaining roasted pyrite material, which contained 0.55 percent weight S, 0.09 percent by weight Cu and 0.15 percent by weight Zn, was filtered off and mixed intimately with slaked lime. The added slaked lime, $Ca(OH)_2$, comprised 10 percent of the total weight of the mixture calculated on dry basis. The mixture was rolled into pellets, which were fed into a pressure autoclave, in which the pellets were held in a steam atmosphere at a temperature of approximately 200°C and a pressure of approximately 20 atmospheres for 8 hours. The resultant pelletshaped agglomerates were of uniform size, presented a good degree of strength when cold and also possessed sufficient strength at high temperatures under reducing conditions to enable the pellets to be charged and reduced in blast furnaces without difficulty, and were not dust forming.

Experiments also showed that the slaked lime in the aforedescribed embodiment can be replaced by any of the aforementioned binders without changing the result to any significant extent.

What is claimed is:

1. A method for purifying and agglomerating pyrite cinders, comprising (1) grinding the pyrite cinders, (in at least one grinding operation) (2) removing sulphide material from the ground pyrite cinders by flotation, (3) forming an aqueous mixture containing the ground and purified pyrite cinders and a binding agent comprising slaked lime, finely ground and slaked steel furnace slag, Portland cement, finely-divided silica, finely divided silicate containing material or mixtures thereof, (4) agglomerating the mixture and (5) heating the agglomerates for 1 to 24 hours in an atmosphere consisting essentially of steam, at a temperature of approximately 160° – 230°C and a pressure of approximately 10 – 70 atmospheres above atmospheric.

2. A process as claimed in claim 1, characterized in that prior to flotation the roasted pyrite material is subjected to leaching for the purpose of removing sulphate material therefrom.

3. A process as claimed in claim 2, characterized in that leaching is effected with the assistance of water which has been acidified by means of a sulphur compound.

4. A process as claimed in any of claim 1, characterized in that there is added to the mixture iron ore concentrates having a particle size exceeding the particle size of the ground roasted pyrite material.

5. A process as claimed in any of claim 1, characterized in that the ground roasted pyrite material is floated in a substantially neutral environment.

6. A process of claim 5, characterized in that during the flotation process there is used a collector of the dithiocarbonate or dithiophosphate-type.

7. The process of claim 1, wherein the pyrite cinders are ground to a particle size-within the range of 80 percent by weight below 90 $\mu$m and 80 percent by weight below 30 $\mu$m.

8. The process of claim 1 wherein the binding agent consists essentially of slaked lime.

9. The process of claim 1 wherein the binding agent consists essentially of finely ground and slaked steel furnace slag.

10. The process of claim 1 wherein the binding agent consists essentially of Portland cement.

11. The process of claim 1 wherein the binding agent consists essentially of finely divided silica.

12. The process of claim 1 wherein the binding agent consists essentially of finely divided silicate material.

* * * * *